United States Patent [19]
Katsen

[11] Patent Number: 5,210,114
[45] Date of Patent: May 11, 1993

[54] PROCESS FOR PREPARING STABLE DISPERSIONS USEFUL IN TRANSPARENT COATINGS

[75] Inventor: Boris J. Katsen, Longmeadow, Mass.

[73] Assignee: Graphics Technology International Inc., South Hadley, Mass.

[21] Appl. No.: 603,002

[22] Filed: Oct. 25, 1990

[51] Int. Cl.$^5$ ............................................. C08K 7/00
[52] U.S. Cl. ..................... 523/220; 523/351
[58] Field of Search ............................ 241/21, 24, 29; 523/220, 351

[56] References Cited

U.S. PATENT DOCUMENTS

| | | | |
|---|---|---|---|
| 4,102,846 | 7/1978 | Bentley et al. | 260/31.2 N |
| 4,371,642 | 2/1983 | Jaffe | 523/351 |
| 4,681,803 | 7/1987 | Liu | 428/348 |
| 4,783,502 | 11/1988 | Faler et al. | 524/873 |
| 4,832,984 | 5/1989 | Hasegawa et al. | 427/161 |

Primary Examiner—Joseph L. Schofer
Assistant Examiner—David Wu
Attorney, Agent, or Firm—Burns, Doane, Swecker & Mathis

[57] ABSTRACT

Provided is a process for preparing a stable dispersion. The dispersion is comprised of a pigment, such as cuprous iodide, dispersed in a binder resin solution. The process is comprised of first dispersing the pigment into a binder resin solution, grinding the dispersion, preferably until a bi-modal distribution of pigment particles is obtained, separating the dispersed particles into two fractions and then recovering the fraction having the smaller average particle size. The resulting dispersion has been found to be quite stable and useful in transparent coatings applicable to electrophotography, electrostatic and thermal imaging elements.

20 Claims, 7 Drawing Sheets

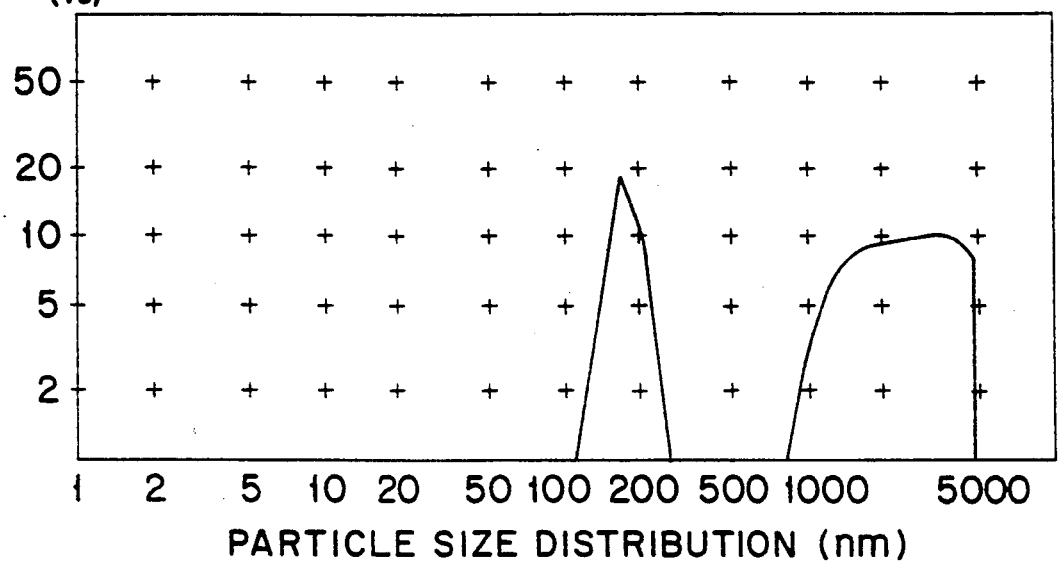
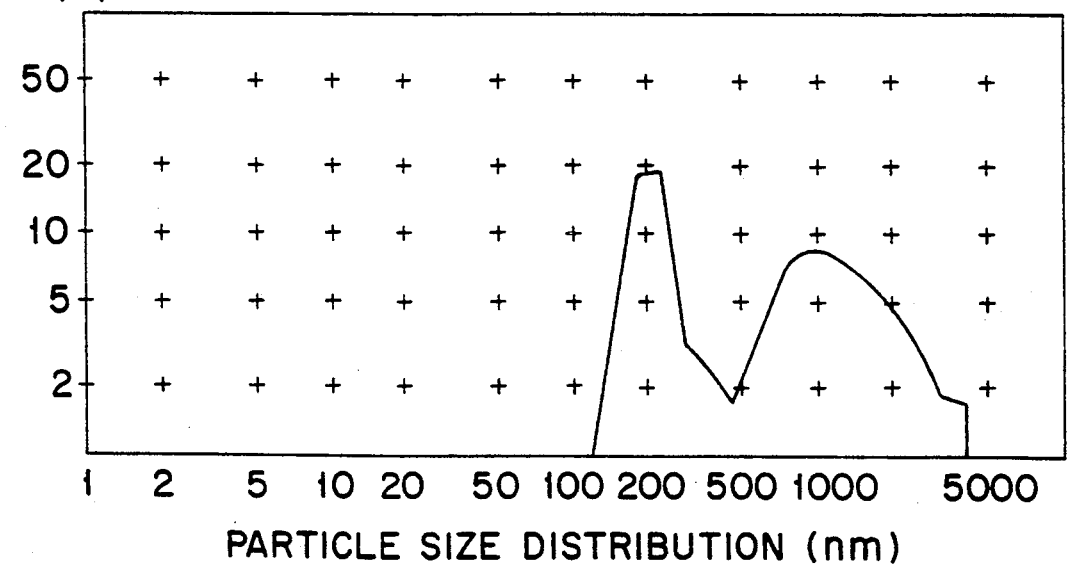

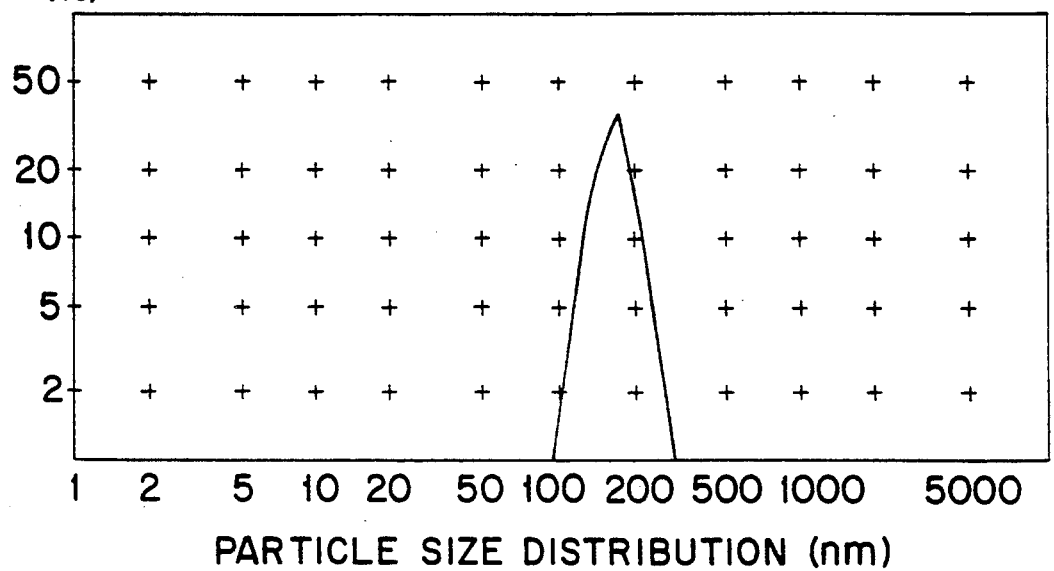
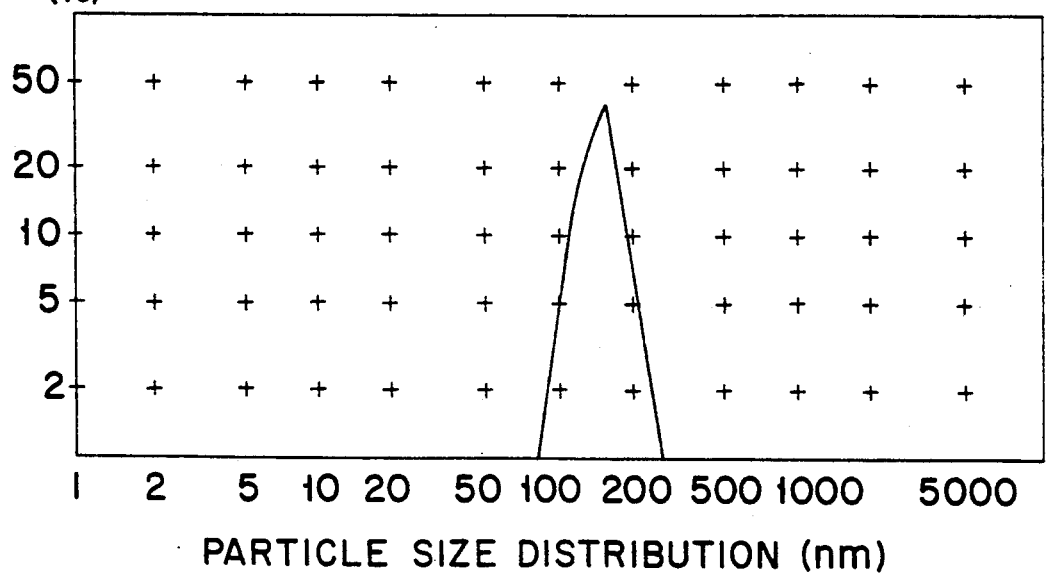

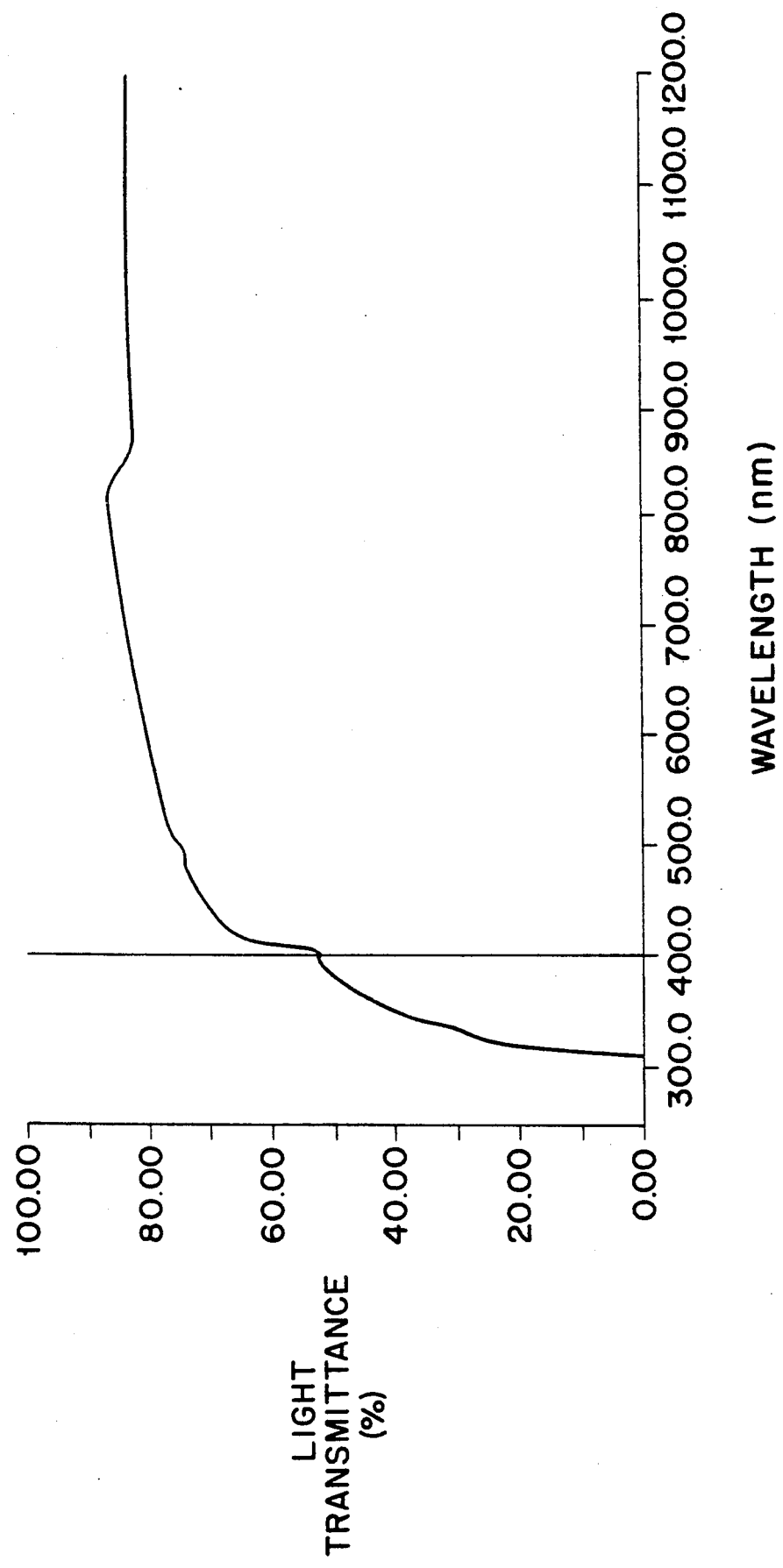

PROCESS FOR PREPARING STABLE DISPERSIONS USEFUL IN TRANSPARENT COATINGS

BACKGROUND OF THE INVENTION

There are many known processes for preparing transparent coating layers for electrostatic, electrophotographic and thermal products. However, most of the known processes involve the use of volatile and toxic solvents, or involve highly unproductive and energy inefficient sputtering or vacuum vapor deposition techniques.

Cuprous iodide is the pigment most often used in preparing ground planes useful for electrostatic and electrophotographic processes. The application of cuprous iodide from solution is disclosed in the article of V. Sumita et al., *Journal of Appl. Polymer Science*, Vol. 23, pp. 2279-91 (1979). A transparent cuprous iodide layer is obtained by treating polyvinyl alcohol complexes of cupric sulfate with vapors of iodine carried in acetone. The entire process requires special measures to contain the highly toxic iodine vapors and extremely flammable acetone vapors. There are also side reactions which render the system nonconductive and make the process unstable.

The use of acetonitrile or other toxic solvents as a solvent for coating cuprous iodide is disclosed in numerous patents, such as U.S. Pat. No. 3,505,131, and Japanese Patent Publication 58/136044. East German Patent Nos. DD223,550, DD220,155, DD201,527, DD157,369, DD157,368, and DD149,721 illustrate the preparation of conductive layers containing cuprous iodide from organic solutions, including acetonitrile solutions, or the preparation of opaque conductive strips for the purpose of annotation using a dispersion of cuprous iodide in a binder.

Other methods of depositing cuprous iodide are known to the art, e.g., forming complexes of cuprous iodide with alkyl amine compounds. Such processes, however, result in the evolution of complexing ligands during the process of drying the deposited coatings.

Thus, there is a need in the art for a process which can safely and efficiently prepare a more stable dispersion, particularly of cuprous iodide.

In thermal products, the coating components are often encapsulated inside transparent microcapsules, and are used in producing transparent thermal films for printer-plotters and still video camera recording processes. However, the wall of each individual capsule is a heat insulator and thereby provides a barrier for the heat transfer from the thermal head of the printer to the imaging material. Accordingly, circumvention of the need for encapsulation would be beneficial, particularly with respect to the printing density.

There is also a need in the prior art for a process for preparing dispersions useful as transparent conductive layers for electrostatic, electrophotographic and thermal products which permits a high level of purity in the final product. Products which are used in electrostatic, electrophotographic and thermal applications involve functional coatings whose performance often depends on the level of purity involved. Many times, impurities are introduced into the coating via contact with the equipment during the processing of the products.

Accordingly, it is an object of the present invention to provide a process which is capable of producing colloidal dispersions which possess stable physical and chemical characteristics and which can be used in the conductive coating of an electrostatic or electrophotographic imaging element, or in a thermal product.

Yet another objective of the present invention is to provide a process which can produce stable aqueous and solvent based colloidal dispersions.

Still another object of the present invention is to provide a process for preparing thermal products having a transparent coating without the need for encapsulation.

These and other objects of the present invention will become apparent upon a review of the following specification, the Figures of the Drawing, and the claims appended thereto.

SUMMARY OF THE INVENTION

In accordance with the foregoing objectives, there is provided by the present invention a process for preparing a colloidal dispersion which is highly stable. Such colloidal dispersions can involve any functional pigments useful in electrostatic, electrophotographic, thermal and similar applications. Cuprous iodide is one example of such a functional pigment. The process of the present invention comprises:

(i) dispersing a pigment into a binder resin solution;
(ii) grinding the dispersion, preferably until a bi-modal distribution of pigment particles is obtained;
(iii) separating the dispersed particles into two fractions of dispersed particles; and
(iv) recovering the dispersion of particles having the smaller average particle size.

In a preferred embodiment, the pigment particles are cuprous iodide particles, and the binder resin solution is an aqueous solution of a polyvinyl alcohol.

The process of the present invention has been found to be highly efficient in yielding an extremely stable dispersion. Such a stable dispersion, depending upon the pigment employed, is readily applicable to the manufacture of ground planes useful in electrophotography and electrostatic applications. The ground plane is prepared by casting the dispersion of the present invention on a suitable support. The stable dispersion has also been found useful in preparing transparent thermal products.

BRIEF DESCRIPTION OF THE DRAWING

FIGS. 1 and 2 graphically depict the particle size distribution of dispersions having a bi-modal distribution.

FIGS. 4 and 5 graphically depict the particle size distribution of separated fractions of particles.

FIG. 9 graphically depicts light transmittance vs. wavelength.

DETAILED DESCRIPTION OF THE PREFERRED EMBODIMENTS OF THE INVENTION

Figure 3:
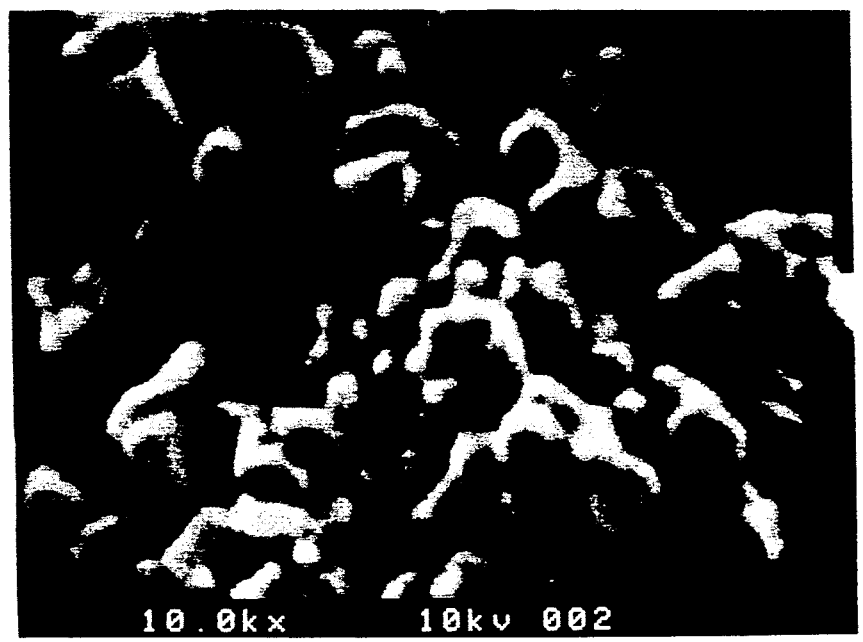
FIG. 3 is a photomicrograph of a bi-modal distribution of particles, showing the large and smaller particles.

The present invention utilizes a surprising discovery that the comminution of pigments in a dispersion, preferably until a bi-modal distribution of particles is achieved in the dispersing medium, with subsequent separation of a fraction of particles having the smaller average particle size, yields a colloidal dispersion which is extremely stable. A stable dispersion is intended to refer to a dispersion of particles wherein the average particle size does not substantially change, nor do the particles tend to aggregate or settle out of the dispersion over a period of time, e.g., one day up to four weeks or more.

The first step in the process of the present invention is to disperse a pigment into a binder resin solution. The pigment is generally any useful functional pigment for electrostatic, electrophotographic, thermal and similar applications, with cuprous iodide being the preferred compound in the practice of the present invention due to its acceptance and usefulness in numerous such applications.

Specific examples of other suitable pigments include, but are not limited to, fluoran type leuco dyes and thermal imaging developers such as bisphenol A, conductive oxides, and in particular semiconductor compounds. The term "semiconductor", as used herein, encompasses those metal containing compounds having a specific resistance in the range of $10^{-3}$ to $10^9$ ohm-cm, as measured by standard procedure. Among semiconductor compounds other than cuprous iodide to which the present invention would be applicable are other copper halides, silver halides including silver iodide, halides of bismuth, gold, indium, iridium, lead, nickel, palladium, rhenium, tin, tellurium and tungsten; cuprous, cupric and silver thiocyanates, and iodomercurates. Specific examples of conductive oxides include tin oxide, indium-doped tin oxide, fluorine-doped tin oxide, iron oxide, aluminum oxide, and cadmium oxide among other conductive oxides.

The binder resin solution can involve any suitable solvent for a binder resin selected from among any of the suitable known binder resins. For example, a suitable binder resin may be selected from among the following: gelatin, polyvinyl alcohol, polyvinyl acetate, carboxylated polyvinyl acetate, polyvinyl acetal, polyvinyl chloride, polyvinyl phthalate, polyvinyl methyl ether maleic anhydride, polymethylmethacrylate, polyvinyl acetal phthalate, polystyrenebutadiene-acrylonitrile, polyvinyl butyral, polystyrene-maleic acid, polyvinylidene chloride-acrylonitrile, polymethylmethacrylate-methacrylic acid, polybutyl methacrylatemethacrylic acid, cellulose acetate, cellulose acetate-butyrate, cellulose acetate-phthalate, cellulose ethylether phthalate, methylcellulose, ethylcellulose, polymethylacrylate-vinylidene chloride-itaconic acid, poly-2-vinyl pyridine, celluloseacetate diethylamino-acetate, polyvinyl methyl ketone, polyvinyl acetophenone, polyvinyl benzophenone, polyvinylmethyl-acrylatemethacrylic acid, polyvinyl acetate maleic anhydride, polyacrylonitrile-acrylic acid, polystyrene-butadiene, polyethylene-maleic acid, poly-4-vinyl pyridine, carboxylic esters of rosin lactones, polystyrene, cellulose nitrate, polyurethane resins, polyamide resins, phenolic resins, urea resins, melamine resins, ethyl cellulose diethylamino acetate, other basic polymers, polybasic acid polymers, polyesters, epoxy resins, alkyds, etc. However, the transparency of the coating films can be affected by the binder, as evaluated by the optical density of these films and Gardner Hazemeters. It is, therefore, preferable to use a polyvinyl butyral, ethyl cellulose, or copolymer of polyvinylidene chloride and acrylonitrile binder when using an organic solvent system, since the transparency of the semiconductive coating film appears to be enhanced.

Generally, about 0.1 to 10 wt percent of the binder is utilized in the final dispersion of the present invention, with from about 0.2 to 2 wt percent being most preferred. Once such a dispersion is coated onto a suitable support and dried, the binder content in the coating will generally range from about 1.0–20 percent by weight, with from about 3.0 to 10 percent by weight being most preferred. The more conductive one desires the coating, the less binder that is used. The desired conductivity, of course, will depend upon the ultimate application.

When using an organic solvent system, solvents with moderate boiling points are preferred. Particular examples of useful organic solvents include toluene and volatile ketone solvents. Suitable ketone solvents include acetone, methylethylketone, 2-pentanone, 3-pentanone, 2-hexanone, 2-heptanone, 4-heptanone, methylisopropylketone, methylisobutylketone, methyl t-butylketone, diacetyl, acetyl acetone, acetonyl acetone, diacetone alcohol, mesityloxide, chloroacetone, cyclopentanone, cyclohexanone, acetophenone, and benzophenone. A mixture of these ketone solvents may be used or a single ketone solvent may be used. It is preferable, however, to dissolve the binder in a solvent system of toluene, or toluene with methyl ethyl ketone. Generally, in a system with methyl ethyl ketone, the toluene is present in the range of 70–90 weight percent, while the ketone solvent is generally present in the amount of 10–30 weight percent. Other polar solvents can also be used with toluene, e.g., ethyl alcohol.

When an aqueous solvent system is employed in preparing the dispersion, the binder is preferably a water soluble polymer, such as polyvinyl alcohol. Other suitable water soluble polymers which are preferred include methylcellulose, hydroxyethylcellulose, hydroxypropylcellulose, soluble grades of gelatin, carboxymethylcellulose, soluble grades of styrene-maleic anhydride copolymers, water soluble acrylic polymers and polyvinyl pyrrolidone.

A surfactant may optionally be used to aid in dispersing the pigment in the binder resin solution. Any surfactant may be utilized as is known in the art, such as lauryl sulfate, a fluorosurfactant, organic titanate, phospholipids, hydroxylated polymers, dialkylsulfosuccinates, lecithin etc. The surfactant is normally present in the range of from about 0.05 to 0.5 wt % of the dispersion, or from about 0.05 to 5 wt% of the pigment. For example, it has been found that silanol modified polyvinyl alcohol can be used as a dispensing aid and also serves as an additional binder to provide advantageous results.

The next step of the process involves grinding the dispersion, in order to comminute the particles, preferably until a bi-modal distribution of pigment particles is obtained. The term "bi-modal distribution" refers to a distribution of particles into at least two separate fractions of different average particle size. Generally, only two separate fractions or modes are observed. If more than two modes are observed, then the first mode will be considered the fraction of particles having the smaller average particle size and the second mode will encompass the remaining fractions.

An example of a bi-modal particle size distribution is given in FIGS. 1 and 2. A photomicrograph showing a bi-modal distribution of particles, which resulted from several passes of a dispersion through an impingement mill, is shown in FIG. 3.

In FIG. 1, two modes are observed. The average particle size of the mode containing the smaller particles is about 150 nm, whereas the average particle size of the other mode is about 2 microns. In FIG. 2, two modes are also observed with the average particle size of the mode containing the smaller particles being about 140 nm. The other mode in FIG. 2 exhibits an average particle size of about 850 nm. Generally, for ease in subsequent separation, it is preferred that a difference of at least about 100 nm in average particle size exist between the two modes or fractions of particles. Once a separation occurs, only a dispersion containing the smaller particles is retained, as shown in FIGS. 4 and 5, respectively. This dispersion of smaller particles, when deposited on a support and dried, forms a thin, extremely transparent, conductive layer, e.g., with the light transmittance being as high as 90% in the visible region. A material is considered to be transparent for a defined wavelength range when transmittance of light within that wavelength range is at least 50% or more. Not only have conductive layers prepared from the dispersions of the present invention been found to be transparent in the visible region, but also in the reprographic region of the UV spectrum.

The comminuting of the particles can take place in a single step, or in a two-step process. For example, the dispersion can first be milled in any generally appropriate and available mill, e.g., such as a ball mill, sand mill or media mill. Media mills which employ a horizontal media mill such as those manufactured by Netzsch, Eiger, Premier, and the like are efficient, and dispersions prepared using a horizontal media mill have been found to produce excellent colloidal dispersions which provide quality coatings on substrates. A media mill can therefore be used to reduce the size of the particles to a certain level.

Excellent colloidal dispersions can also be prepared using other mills, e.g., an impingement mill. In fact, it has been found that use of an impingement mill is most effective and efficient in reproducibly and consistently achieving a bi-modal distribution of particles within the dispersion. An impingement mill operates by subjecting the dispersion to a pressure of as much as 23,000 psi in a hydraulic pump. The pump pushes the dispersion into a decompression chamber where the particles of the dispersion impinge on one another to comminute the particles. The comminution is effected both by the forces of impingement and cavitation. No foreign grinding medium is involved, which promotes the purity of the resulting dispersions. Descriptions of an impingement mill and their operation are also found, for example, in U.S. Pat. Nos. 4,533,254 and 4,783,502. Impingement mills are commercially available, e.g., Model M110T or M110Y, manufactured by Microfluidics, Inc.

It is most preferred to do the crude grinding in a horizontal media mill or similar mill, and final comminution in an impingement mill. It has been found that such a two-step process for comminuting the particles in the dispersion results in a bi-modal distribution more effectively and efficiently than use of any one type of mill alone. The two-step process also generally results in the smaller mode of particles having an average particle size in the range of about 300 nm or less and that the distribution of particle sizes within the mode is remarkably narrow, which is greatly desired. Accordingly, this two-step process is the preferred method of comminution.

Once the comminuting of the particles is accomplished, a separation of the dispersed particles into two fractions is made. Preferably, a bi-modal distribution of the dispersed particles is achieved, in which case the separation is into the two separate modes of particles created by the grinding. Generally, one of the modes will have an average particle size of about 300 nanometers or less, more preferably of about 200 nm or less, and most preferably of about 150 nm or less. It is this mode which is recovered and saved for use in the preparation of transparent coatings, e.g., for conductive and thermal imaging applications. The dispersion comprised of the second mode of particles having an average particle size greater than 300 nanometers can be used for other applications, or may be simply returned back to the manufacturing process for further grinding and separation.

The separation step can be achieved by any appropriate means available. It is preferred, however, that microfiltration or centrifugation be employed for reasons of practicality and efficiency. In particular, centrifugation is most preferred as it has been found to be quite efficient and effective in the separation of particles of 300 nanometers and less from the bulk of larger particles.

The resulting colloidal dispersion has been found to be extremely stable and can be used for many different applications, depending upon the pigment utilized. With cuprous iodide as the pigment, the dispersion is quite applicable in the preparation of ground planes useful in electrophotographic or electrostatic imaging elements. For example, a colloidal dispersion can be layered or coated onto a support by any conventional means. Any support or substrate layer may be utilized to produce a ground plane for a conductive element. These supports generally consist of polymer films such as polyethylene terephthalate films (PET), polyethylene films, polypropylene films, bond coated polyester films, as well as any other support utilized in the art. Other supports, however, such as paper supports, can also be appropriately used. The support materials may be properly selected according to the use and purpose of the transparent coated element.

The manner in which the colloidal dispersion is applied to the support can also be by any conventional means, e.g., coating by a Mayer rod, roll coating, gravure, offset gravure, whirl coating, dip coating, spray coating, etc. The means for applying the colloidal dispersion is only limited by the fact that a colloid may be difficult to apply with various forms of instrumentation.

After forming the ground plane of the conductive layer on a support, a barrier layer may be further coated over the conductive layer with any known coating technique that is available in the art. The barrier layer, e.g., may comprise a polymer of polyvinyl alcohol or polyamide. A further coating of an electrophotographic layer may then be coated on the top of the barrier layer to form an electrophotographic layer. Similarly, a ground plane can also be utilized for preparing a dielectric element by coating a dielectric coating over the conductive layer.

Figure 6:
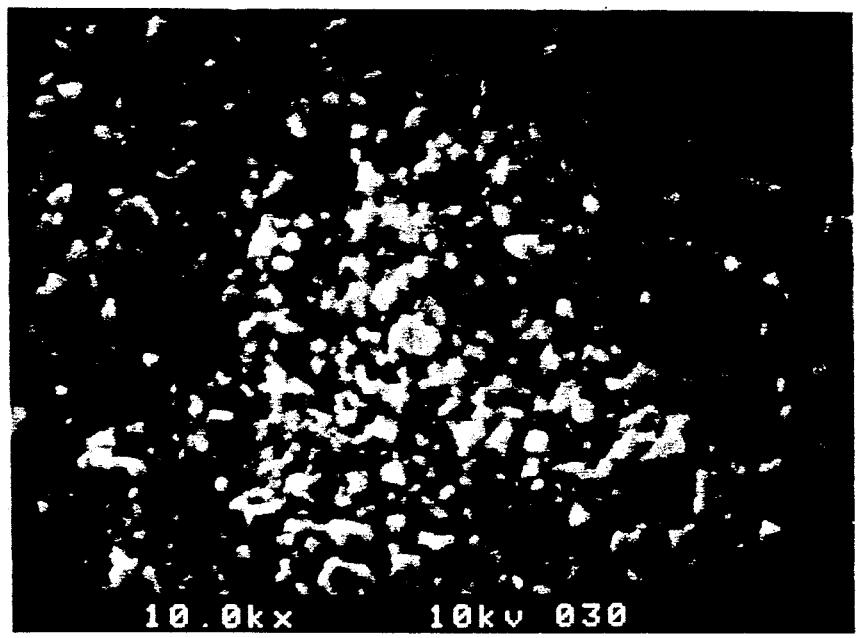
FIG. 6 is a photomicrograph of a coating on a support made with a dispersion which had been subjected to a two-step grinding procedure.
Figure 7:
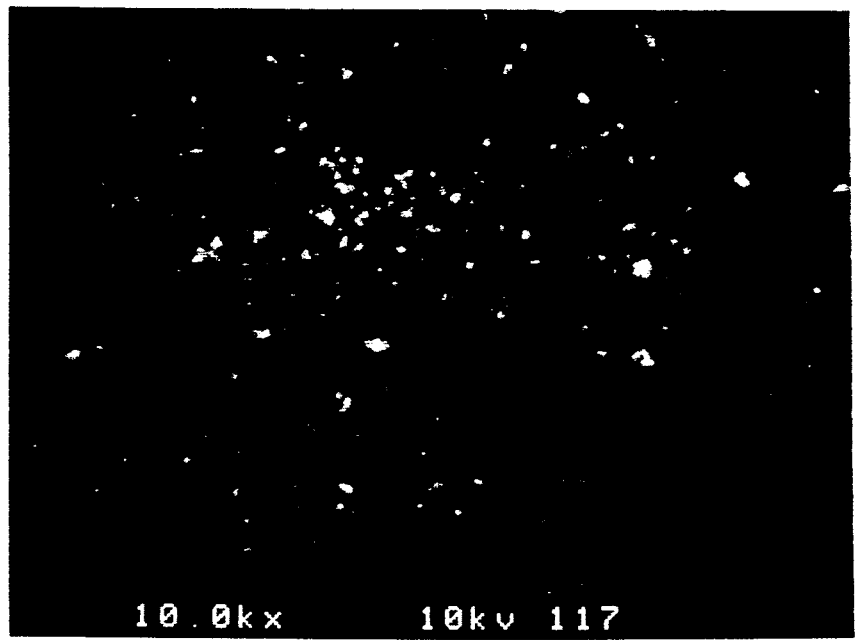
FIG. 7 is a photomicrograph of a coating on a support made with a dispersion which had been subjected to a two-step grinding procedure and a separation step.

Some of the advantages of employing the separation step of the present invention can be seen from FIGS. 6 and 7. FIG. 6 is a photomicrograph of a coating on a polyester support derived from a dispersion which had been subjected to a two-step grinding procedure, but no separation step. FIG. 7 is a photomicrograph of such a coating which had been subjected to a separation step. The improved uniformity of the coating in FIG. 7 is quite clear.

The following examples are provided in order to further illustrate the present invention and the advantages thereof. The examples are in no way meant to be limitative, but merely illustrative.

EXAMPLE 1

845 grams of technical grade cuprous iodide were dispersed in a solution made from 1465 grams of distilled water, 9.5 grams of fully hydrolyzed polyvinyl alcohol and 0.5 grams of silanol modified polyvinyl alcohol (Kuraray-Poval R-2105). The dispersion was obtained by mixing the cuprous iodide and the binder resin solution in a Silverson Mixer Model L4R. After two hours of mixing, the average particle size of the cuprous iodide was about 3.0 microns.

The resulting dispersion was then treated with an additional two hours of continuous grinding in a laboratory horizontal media mill. The resulting dispersion involved cuprous iodide particles having an average size of about 1.2 microns.

This dispersion was then treated in an impingement mill, Microfluidizer Model M110Y, at about 20,000 psi hydraulic pressure. After one pass through the Microfluidizer, the average particle size of the cuprous iodide particles was reduced to about 520 nanometers. After the tenth pass through the Microfluidizer, the average size of the cuprous iodide particles was about 443 nanometers. Each pass had a flow rate of about 400 ml per minute.

The resulting dispersion after the tenth pass through the impingement mill was observed to have a bi-modal distribution as determined by a Malvern Particle Size Analyzer, Model Autosizer 2C. This dispersion was centrifuged at 450 g (roughly about 450 rpm) for about three minutes. A dispersion of particles having an average size of less than 200 nanometers was recovered. This dispersion had a solids content of 11.2 wt %, and the average particle size was about 148 nanometers.

The resulting dispersion was then coated onto a polyester support to provide a transparent conductive coating. This conductive coating exhibited a light transmission in the visible spectrum of at least about 80%.

EXAMPLE 2

A copolymer of acrylonitrile and vinylidene chloride (available under the trademark SARAN F310) was dissolved in a mixture of solvents comprising methylethylketone, toluene and ethyl alcohol. Cuprous iodide particles were also added to the mixture. The mixture had the following composition:

| | |
|---|---|
| methylethylketone | 500 g |
| toluene | 400 g |
| ethyl alcohol | 100 g |
| copolymer | 20 g |
| cuprous iodide | 845 g |

The mixture was then passed through an impingement mill as in Example 1. After ten passes through the impingement mill the average particle size of cuprous iodide particles was about 1.9 microns, with 54% of the particles being below 1.2 microns. After 15 passes through the impingement mill, 53% of all particles were in one mode averaging 90 nanometers in size, with the second modality being in a range of from about 1387 nm to 3040 nm.

EXAMPLE 3

The procedure of Example 1 was repeated, except that the resulting dispersion was subjected to 11 passes through the impingement mill. The average particle size of the cuprous iodide was about 397 nanometers, and a bi-modal distribution of particles was observed. This dispersion was then separated into 5 different batches and subjected to centrifugation under various conditions. After each centrifugation, the liquid containing the smaller, sub-micron particles was then decanted. The larger particles remained on the bottom of the centrifuging tube, and were returned for further processing after dilution with water. The results are tabulated below in Table 1.

TABLE 1

| Centrifugation of Bi-Modal Dispersion | | | |
|---|---|---|---|
| Time (min.) | Average Particle Size (nm) | RPM's | % Solid |
| 1.5 | 239.5 | 4020 | 18.2 |
| 3.0 | 198 | 4020 | 12.05 |
| 1.5 | 199 | 4500 | 14.2 |
| 3.0 | 148 | 4500 | 11.2 |
| 4.5 | 148 | 4500 | 9.32 |

The five dispersions were then applied at various coating weights to polyester supports. The transparencies and visual densities were measured, and are recorded below in Table 2. The transparencies were measured at 411 nanometers by a Perkin-Elmer UV-VIS-NIR Spectrophotometer Model Lambda 9. The visual density was measured by a MacBeth Densitometer Model TR-927.

TABLE 2

| Coating Weight* (lbs/3000 sq ft) | Visual Transmission Density | Absorption at 411 nm |
|---|---|---|
| Uncoated Polyester Support | 0.07 | 0.08 |
| 0.2 | 0.08 | 0.22 |
| 0.213 | 0.08 | 0.250 |
| 0.262 | 0.09 | 0.294 |
| 0.313 | 0.10 | 0.327 |
| 0.597 | 0.11 | 0.655 |

*determined by X-ray fluorescence

Figure 8:
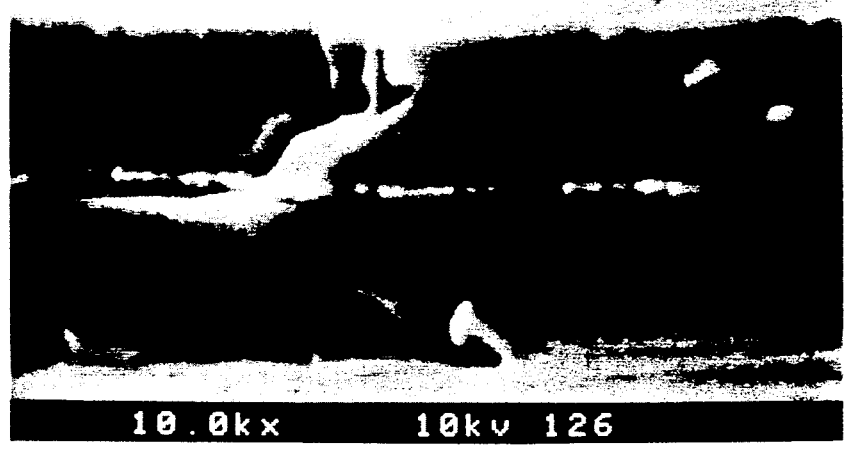
FIG. 8 is a photomicrograph of a conductive layer on a polyester support with a dielectric coating layer over the conductive layer.

A dielectric coating was then applied over each of the conductive coatings noted above and prints were made on a VF-80 printer-plotter. The samples having an absorption value below 0.25 gave good and clear diazo reproduction. However, when the prints were viewed on a visual projector, all samples gave a sharp and clear image on the display screen. FIG. 8 is a micrograph of such a construction having a dielectric coating over a conductive coating prepared in accordance with the present invention, on a polyester support. The conductive coating is the thin white layer in the photomicrograph. There is a distinct boundary between all three layers, indicating that each layer is distinct.

Coatings were also made on a polyester support using a Mayer rod No. 2 providing a transparent coating layer with visual density below 0.1 for particles below 200 nanometers. A slightly opaque layer was observed for those coatings wherein the particles were greater than 200 nanometers in size, e.g., 239 nanometers.

EXAMPLE 4

A dispersion was prepared as in Example 1 and was adjusted by the addition of potassium iodide and additional silanol modified polyvinyl alcohol. Accordingly, the composition of the dispersion was as follows:

| Dispersion of Example 1 | 16.5 kg |
|---|---|
| Silanol Modified PVA | 0.18 kg |
| Potassium iodide | 21.3 g |

After drying, the dry coating of the dispersion consisted of the following:

| CuI | 92.2% by weight or 74% by volume |
|---|---|
| PVA | 4% by weight or 15% by volume |
| Modified PVA | 2.4% by weight, 9% by volume |
| Potassium iodide | 1.3% by weight, 2% by volume |

The transparency of the resulting conductive ground plane was measured by a Perkin-Elmer UV-VIS-NIR Spectrophotometer Model Lambda 9. The results are depicted in FIG. 9, which shows a transmittance in the visible region of at least 80% and a transmittance greater than 50% in the region corresponding to the peak of the diazo reprographic area (about 400 nm).

EXAMPLE 5

The present Example illustrates the stability of the dispersions prepared by the process of the present invention. Dispersions were prepared in accordance with the procedure of Example 1 and were left to stand without agitation. The particle size was measured using a Malvern Particle Size Analyzer, Model Autosizer 2C. The results are tabulated below in Table 4.

TABLE 4

| Dispersion | Particle Size (nm) Day 1 | Particle Size (nm) Day 29 |
|---|---|---|
| A | 147.8 | 152.4 |
| B | 120.1 | 119.7 |
| C | 132.7 | 139.1 |
| D | 134.8 | 142.5 |

Dispersion D was used in a reverse roll station to coat a substrate. After 8 hours of the coating process, an average particle size was measured in the coating as 154.1 nanometers. Therefore, the dispersions showed a remarkable stability. There was no aggregation and no settling despite a lack of agitation. Moreover, after eight hours of high shear processing of the dispersion in a reverse roll station, no significant changes in the average particle size was observed.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for preparing a stable dispersion of pigment in diluent useful in transparent coatings, comprising the steps of
   (i) dispersing a pigment into a binder resin solution;
   (ii) comminuting the dispersion until a bi-modal distribution of pigment particles is obtained; and
   (iii) separating the dispersed particles into two fractions of dispersed particles including a stable dispersion of smaller particles in a binder resin solution.

2. The process of claim 1, wherein the pigment is comprised of cuprous iodide.

3. The process of claim 1, wherein the binder resin solution is an aqueous solution, and the binder resin is a polyvinyl alcohol.

4. The process of claim 1, wherein the comminuting step (Ii) is comprised of two separate steps.

5. The process of claim 4, wherein the two separate steps comprise grinding the dispersion in one type of mill and then comminuting the resulting dispersion in a second type of mill which is an impingement mill.

6. The process of claim 1, wherein one of the modes of particles has an average particle size of 300 nanometers or less.

7. The process of claim 1, wherein the separation step is accomplished by microfiltration or centrifugation.

8. The process of claim 1, wherein
   (i) the pigment is comprised of cuprous iodide and the binder resin solution is comprised of an aqueous solution of a polyvinyl alcohol;
   (ii) the dispersion is comminuted until a bi-modal distribution of pigment particles is obtained, with the mode of particles of smaller average size having an average particle size of 300 nanometers or less, and with the comminuting comprising first grinding the dispersion in one type of mill and then comminuted the resulting dispersion in a second type of mill which is an impingement mill;
   (iii) the dispersed particles are separated into two fractions by centrifugation or filtration; and
   (iv) the separated fraction having the smaller average particle size is recovered as the stable dispersion useful in transparent coatings.

9. The process of claim 8, wherein the dispersed particles are separated by centrifugation.

10. The process of claim 8, wherein the average particle size of the mode of particles recovered is about 200 nanometers or less.

11. The process of claim 8, wherein the polyvinyl alcohol binder resin is comprised of a silanol modified polyvinyl alcohol.

12. The process of claim 3, wherein the binder resin is comprised of a silanol modified polyvinyl alcohol.

13. The process of claim 1, wherein the dispersion of pigment particles is comminuted in an impingement mill to form the bi-modal distribution of pigment particles.

14. The process of claim 13, wherein one of the modes of particles has an average particle size of 300 nanometers or less.

15. The process of claim 13, wherein the separation step is accomplished by microfiltration or centrifugation.

16. The process of claim 1, which further comprises recovering the fraction of particles having the smaller average particle size.

17. The process of claim 1, wherein the pigment is comprised of a conductive oxide.

18. The process of claim 17, wherein the conductive oxide is a tin oxide.

19. The process of claim 18, wherein the tin oxide is a doped tin oxide.

20. The process of claim 1, wherein the pigment is comprised of a leuco dye.

* * * * *